Nov. 24, 1959  C. W. ROSE  2,914,139
CABLE CONNECTOR FOR SAFETY BELTS
Filed Jan. 10, 1955  2 Sheets-Sheet 1
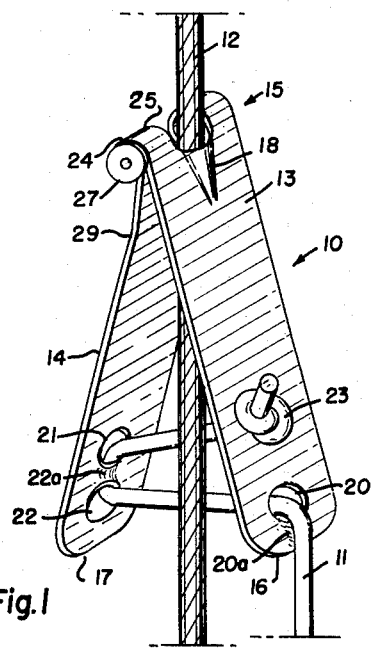
Fig. 1
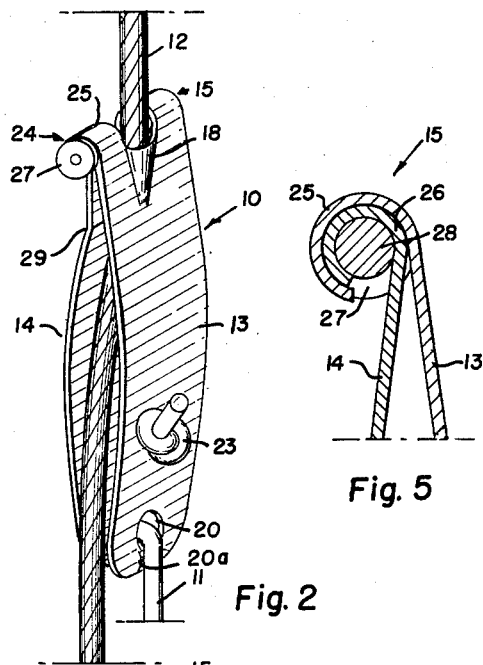
Fig. 2
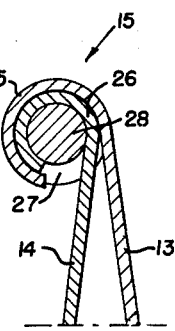
Fig. 5
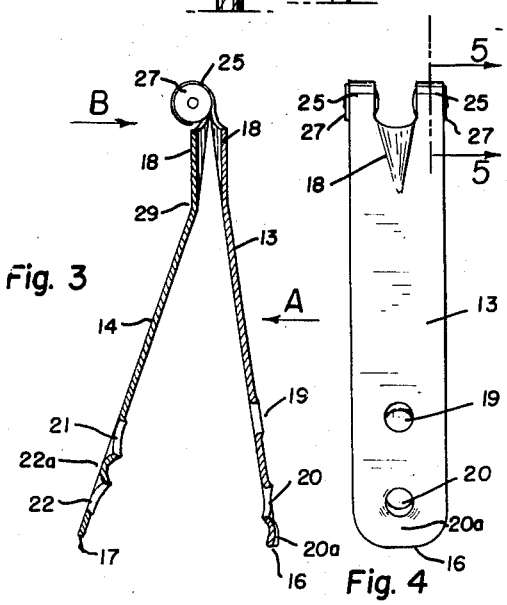
Fig. 3
Fig. 4
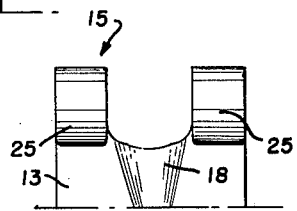
Fig. 6
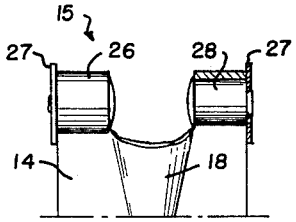
Fig. 7
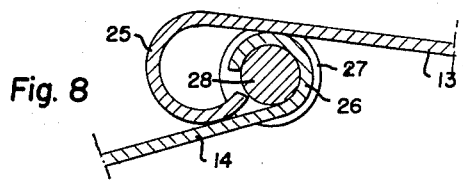
Fig. 8
INVENTOR.
Clarence W. Rose
BY WHITEHEAD & VOGL
PER
ATTORNEYS Nov. 24, 1959    C. W. ROSE    2,914,139
CABLE CONNECTOR FOR SAFETY BELTS
Filed Jan. 10, 1955    2 Sheets-Sheet 2
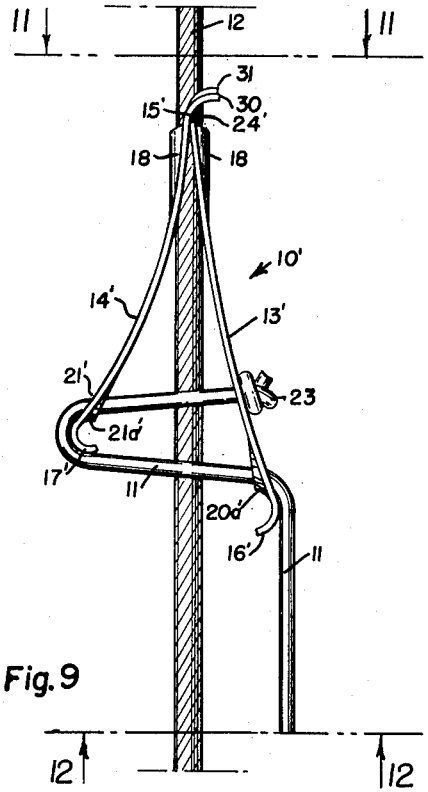
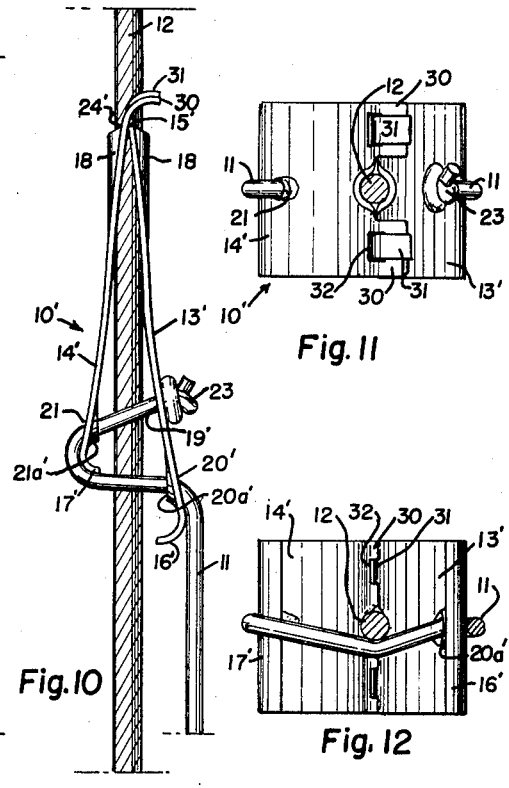
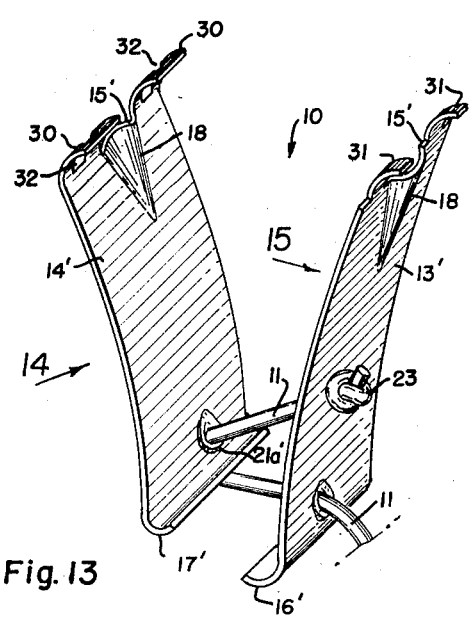
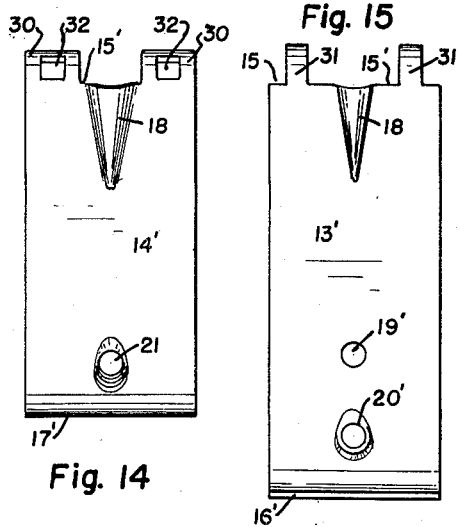
INVENTOR.
Clarence W. Rose
BY WHITEHEAD & VOGL
PER *Carl Whitehead*
ATTORNEYS United States Patent Office 2,914,139
Patented Nov. 24, 1959

2,914,139
CABLE CONNECTOR FOR SAFETY BELTS
Clarence W. Rose, Denver, Colo.
Application January 10, 1955, Serial No. 480,840
6 Claims. (Cl. 188—65.1)

This invention relates to connectors and attachment devices for ropes, and more particularly to that class of connectors for attaching a rope or cord to a cable, a main object of the invention being to provide a novel and improved cable-connector for attaching the end of a rope to a suspended cable, usually vertical.

Another main object of the invention is to provide a novel and improved cable-connector for so attaching the end of a safety rope or lifeline such as that connected to a worker's safety belt at any selected point along the span of a suspended cable. Such cables may be a part of or may be supplied incident to many types of structures including derricks, elevator shafts and suspension bridges. Often a worker has to be positioned upon a hazardous perch at a location where an anchor hook or beam is not conveniently available for conventional attachment of a safety rope or lifeline and it follows that a rope or cable, suspended from a point above may be actually the most satisfactory anchor for the attachment of the lifeline of the worker's safety belt. Such a cable may be a permanent part of the structure, or may be supplied for the particular purpose of holding the lifeline. However, if the worker uses his lifeline at all with such a cable, he may attempt to tie it to the cable in a manner which may or may not hold the line in case of a fall.

At best, a hand tied rope to a vertical cable is unsatisfactory for safety purposes and with this in view, the present invention was conceived and developed, and comprises in essence, a clamp-like connector, hereinafter referred to as a cable connector, which is permanently attached to the end of the lifeline of a safety belt and is adapted to embrace and be locked upon a vertical cable to secure the line to the cable.

Other objects of the invention are to provide a novel and improved cable connector for attaching a lifeline to a vertically suspended cable which: (a) is quickly and easily secured to or removed from the cable; (b) is adapted to be clamped to the cable at any selected position by a simple tug of the line and to be as easily loosened and shifted along the cable to another position; (c) resiliently grips the cable when force is applied to the lifeline and tightens such grip as the force is increased to prevent slipping; (d) may be adapted to slip somewhat responsive to a sudden jerk as when the safety rope checks the fall of a wearer and thereby eases the shock to the wearer incurred by checking the fall; (e) is of a simple positive action and a reliable safety device; (f) is of such construction that in the manufacture thereof various selected degrees of gripping and slipping may be provided for, whereby the device may be made an effective shock absorber having any desired deceleration value; and (g) is of simple construction, economical, compact, rugged and durable and suitable for other purposes not herein specified.

With the foregoing and other objects in view, all of which more fully hereinafter appear, my invention comprises certain novel and improved constructions, combinations and arrangements of parts and elements as hereinafter described, and as defined in the appended claims, and illustrated, in preferred embodiment, in the accompanying drawings, in which:

Figure 1 is an isometric view of a portion of a vertically suspended cable with my improved cable connector including the associated portion of a life line, engaged to the cable.

Figure 2 is an isometric view similar to Fig. 1 but showing the connector locked onto the cable responsive to a pull on the life line.

Figure 3 is a central, sectional elevation of the connector per se.

Figure 4 is a view of the complete connector, a section of which is shown at Fig. 3, the view being taken in the direction of the arrow A at Fig. 3.

Figure 5 is an enlarged scale fragmentary sectional detail taken on the line 5—5 of Fig. 4.

Figure 6 is an enlarged scale view of a fragmentary portion of one element of the connector as viewed in the direction of the arrow B at Fig. 3.

Figure 7 is like Fig. 6 but showing the other element of the connector with portions broken away to disclose parts otherwise hidden.

Figure 8 is a fragmentary sectional portion like Fig. 5 but showing the elements disconnected and in position for reconnection.

Figure 9 is a side elevation view of an alternate construction of the connection in engagement with the cable and with the associated section of the life line engaged thereto ready for operation.

Figure 10 is a view like Fig. 9 but showing the connection clamped to the cable responsive to a pull on the line.

Figure 11 is a top view of the connector shown at Figs. 9 and 10 on the cable as taken from the indicated line 11—11 at Fig. 9.

Figure 12 is a bottom view of the same connector on the cable as taken on the indicated line 12—12 at Fig. 9.

Figure 13 is a perspective view of the same connector and life line detached from the cable and with the elements of the connector separated as when the connector is detached from the cable and not in use.

Figure 14 is a face view of one of the elements of the same connector as viewed from the indicated arrow 14 at Fig. 13 but without the lifeline.

Figure 15 is a face view of the other element of the same connector as viewed from the indicated arrow 15 at Fig. 13.

Referring more particularly to the drawing, the cable connector 10 is attached to the end of a lifeline 11 of a safety belt and is adapted to be locked upon a suspended cable 12 to anchor the lifeline to the cable. The cable 12 may be of any conventional type such as of manila hemp, or wire rope, and may be limp, taut or rigid or even a solid bar or pipe.

While the cable 12 is shown as being circular in section, it is to be understood that it may be of any section which is substantially circular such, for example, as the section formed by a seven strand rope. Moreover, it is to be understood that the connector may be adapted for use with non-circular elements such as a rail or rectangular bar.

The connector 10 is formed by two rectangular plates of stiff resilient material such as spring steel and comprises a carrier plate 13 and a squeeze plate 14 which are interconnected at their top edges 15 as hereinafter described. From the edges 15, the plates are pre-formed to diverge outwardly so that their respective base edges 16 and 17, which are preferably rounded as shown, are normally spread apart.

Each plate, 13 and 14, includes a centered, vertically-aligned, tapering trough 18 in its upper portion, which extends to the top edge 15 to lie in spaced opposition with the trough of the other plate and these together form a vertical, centered passageway between the top edges 15 wherethrough the cable 12 is adapted to pass when the connector 10 is embracingly engaged to the cable with the cable between the carrier plate 13 and squeeze plate 14.

It follows that a squeezing of the plates upon the cable 12, by pulling together their normally separated base edges, will frictionally secure or lock the connector 10 to the cable, and the lifeline 11 is slippably threaded through orifices in the plates in a manner which will automatically cause such locking whenever the line is pulled. These orifices include an orifice 19 in the lower portion of the carrier plate 13 but substantially above the base edge 16, and a second orifice 20 is also provided in this plate immediately above the base edge 16 and below the orifice 19. A third orifice 21 is formed in squeeze plate 14 at a position preferably slightly lower than orifice 19 and a fourth orifice 22 is formed in plate 14 immediately above its lower edge 17 and substantially opposite to orifice 20.

The lifeline 11 is threaded through these orifices with its end extending through orifice 19 and this end is knotted as at 23 or otherwise enlarged to secure the end of the line against the face of plate 13 and prevent it from passing through the orifice and thereby provide permanent interconnection of the plate to the life line. From the orifice 19, the line extends across the gap between the plates, through orifice 21, in plate 14, back through orifice 22, thence across the gap between the plates and through the orifice 20 to hang from the base edge 16 of plate 13 with the connector engaged to cable 12. The path for line 11 from orifice 21 to orifice 22 is suitably smoothed, as, for example, by bulging or rounding the portion of plate 14 between the orifices as at 22a, and the path of the line 11 from orifice 20 is likewise smoothed as, for example, by a similar bulge or rounding of the lower part of plate 13 as at 20a.

It follows that with a pull of the safety rope 11, the rope will slip through the orifices to draw the base edges of the plates together and squeeze the cable 12 between the plates, from the position illustrated at Fig. 1 to that illustrated at Fig. 2. The cable 12, which usually hangs loosely will be squeezed to one side of the lower rounded edges of the plates, as clearly shown at Fig. 2, likewise, the cable will be forced out to the illustrated position by the body of the worker hanging from and directly beneath the connector.

The tightness of the squeeze of the plates 13 and 14 upon the cable 12 will depend upon the strength of the plates and their relative proportions, and the connector may be designed to lock upon the cable in checking a fall of the wearer of the safety belt whose lifeline is secured to the connector, or preferably it may be designed to permit a certain predetermined amount of slippage as the fall of a wearer is decelerated to a gradual and easy stop. The necessary proportions of the plates for such purposes may be ascertained experimentally by one skilled in the art.

The top edge interconnection of the plates 13 and 14 is preferably a disconnectible hinge 24 of a type which will permit the plates 13 and 14 to be manually separated and the connector 10 thereby removed from the cable 12, it being generally impractical to provide for a permanent interconnection of the plates at the edge 15 which would necessitate the connector being threaded upon the cable 12. However, while such connection is preferably hinged it is within the contemplation of the invention that the connection of the plates at edge 15 be made by disconnectible rigid means in any conventional manner, not shown, and the plates 13 and 14 be resiliently yieldable to provide the necessary clamping action to lock upon the cable.

The hinge 24 is formed by rollably intermeshing fingers turned to cylindrical form from the upper edges of the respective plates, the fingers 25 on the carrier plate 13 rollably embracing fingers 26 on the squeeze plate 14 on a common axis when intermeshed. The cylindrical shaped fingers 25 and 26 are not completely turned but provide gaps which permit an interconnection or disengaging of the plates 13 and 14 when they are spread approximately 180 degrees apart, as clearly illustrated at Fig. 8.

The fingers on each plate are axially aligned on each side thereof with the trough 18 therebetween. To provide lateral alignment of the plates when they are interconnected and to prevent sidewise slipping, washer 27 is attached to each side of the hinge by means of rivets 28 which extend into the smaller diameter fingers 26, said washers being of greater diameter than fingers 26 to thereby bear against the sides of the larger fingers 25.

The normal divergence of the plates 13 and 14 when connected together at the hinges, is provided by suitable shaping as indicated by the bend 29 on squeeze plate 14.

The modified construction of the clamp 10', illustrated at Figs. 9 to 15 inclusive, is especially adapted for use with a cable 12 which is taut or rigid and cannot be pushed aside by the drawing together of the lower edges of the clamp. In this construction the carrier plate 13' and squeeze plate 14' are arched to provide a normal divergence towards their lower edges 16' and 17'. With this construction, a pull of the life line 11 sufficient to clamp cabe 12 in the trough 18 will not bring the lower edges completely together and the cable will continue to hang between the plates, as clearly illustrated as Fig. 10.

A modified arrangement of orifices is illustrated wherethrough the safety line 11 is threaded. An orifice 19' is positioned in the lower portion of the carrier plate 13' substantially above the base edge 16' and a second orifice 20' is also positioned in this plate immediately above the base 16' below the orifice 19'. A third orifice 21' is formed in the squeeze plate 14' immediately above its lower edge 17' and opposite to and substantially between the orifices 19' and 20'. The safety line 11 is threaded through these orifices substantially as hereinbefore described, from orifice 19', across the gap between the plates, through orifice 21', thence underneath the edge 17' and across the gap between the plates and through the orifice 20'. The edge 17' and the path for line 11 is suitably smoothed by rounding and bulging portions of the plates at the orifices as at 21a' and 20a'.

The hinge 24' is formed by fingers 30 which extend from the top edge 15' of plate 14 at each side of trough 18 and similar fingers 31 which extend from the top edge of plate 13'. The fingers 30 are curved from the surface of plate 14' to overhang plate 13' and include slotted orifices 32 wherethrough fingers 31 pass, the fingers 31 being curved to correspond with and lie against the fingers 30. It follows that the connector may be removed from the cable 12 by spreading the plates apart and permitting the fingers 31 to drop out of the orifices 32. It follows that with the plates so disconnected, they may remain upon the safety rope 11 ready for reconnection for subsequent use, as clearly illustrated at Fig. 13.

While I have described many details, and constructions, it is obvious that others skilled in the art can devise alternate and equivalent constructions which are within the spirit and scope of my invention, hence it is my desire that my protection be limited, not by the constructions illustrated and described, but only by the proper scope of the appended claims.

I claim:

1. A connector for attaching the end of a safety belt lifeline or the like to a suspended cable and being adapted to be threaded onto or disconnected from the cable at any selected point along its reach and comprising, in combination, two elongated, matched plates, each plate having a pair of fingers extending from one end thereof with the space between the fingers being sufficient to permit the fingers to embrace the cable, a separable hinge interlock at the end of each finger adapted to engage the opposing finger of the mating plate when the plates are held approximately 180 degrees apart and to thereby thread the plates upon the cable with the cable between the fingers, said plates being thereby hingedly interconnected when they are folded together to an acute angle with the faces of the plates between the fingers forming seats adapted to grip the cable as the plates are pulled together and means carried by the plates near their normally separated ends opposite the finger ends for slidably threading said lifeline through and between the plates whereby to draw the plate ends together responsive to a pull of the lifeline.

2. The connector defined in claim 1 wherein said plates are flat, flexible members and said normally separated ends are adapted to be pulled together beyond the point where said seats grip the cable responsive to flexing of the plates.

3. The connector defined in claim 1, wherein said seats comprise a tapering trough in the surface of each plate adjacent said interconnected end which lies in spaced opposition to a corresponding trough in the opposite plate.

4. In combination with a vertically suspended cable and a safety belt lifeline, a braking clamp carried on the cable and carrying the end of the lifeline and adapted to grip the cable with a selected pressure to slidingly brake the fall of a wearer of the lifeline, and including, two flat, flexible plates connected together at one end by a hinge and having a passage through the hinge through which the cable passes, a gripping surface in each plate adjacent the hinge adapted to grip the cable with the plates pulled together to an acute angle with the ends opposite the hinged end being separated, orifices at said separated ends through which the life line is slippably threaded whereby to pull said normally separated ends together responsive to a pull of the life line and thereby flex said plates until the normally separated ends come substantially together to impose a selected gripping pressure to the cable by said gripping surfaces.

5. A braking clamp for a cable adapted to grip the cable with a selected gripping and braking force responsive to a pull on a life line attached to the clamp and comprising two flexible plates hingedly connected together at one end, a cable guiding passageway at the hinged end adapted to hold the clamp onto a cable, opposed cable gripping surfaces on the plates adjacent to the hinged ends adapted to grip the cable with the plates spread apart at an acute angle and with the ends opposite the hinged end being separated, the flexibility of the plates being such that the separated ends may be pulled together to impose said selected gripping and braking force on the cable, the life line being attached to the separated end of one plate and an orifice in the separated end of the other plate through which the life line is threaded, whereby a pull of the life line pulls the separated ends of the plates substantially together.

6. A braking clamp for a cable adapted to slidably grip the cable with a selected braking force responsive to a pull of a life line attached to the clamp and including in combination therewith, a pair of members, at least one of which is resilient, connected together at one end of the clamp and normally separated at the other end of the clamp with the separated ends being adapted to be pulled together, a guide passageway between the members adapted to receive the cable including gripping surfaces between the members adapted to grip the cable when the separated ends of the members are pulled together, and means connecting said life line to the separated ends of the members adapted to pull the ends together responsive to a pull of the life line, wherein said resilient member flexes to permit the separated ends of the members to come together and grip the cable with a pressure correlated with the flexure strength of the member.

References Cited in the file of this patent

UNITED STATES PATENTS

| 195,026 | La Rue | Sept. 11, 1877 |
| 376,622 | Abbott | Jan. 17, 1888 |
| 485,954 | Lester | Nov. 8, 1892 |
| 693,546 | Johnson | Feb. 18, 1902 |
| 880,757 | Rugg | Mar. 3, 1908 |
| 969,559 | O'Leary | Sept. 6, 1910 |
| 1,459,265 | Saundry | June 19, 1923 |
| 1,589,507 | Bond | June 22, 1926 |

FOREIGN PATENTS

| 255,976 | Italy | Nov. 30, 1927 |